(12) United States Patent
Chau et al.

(10) Patent No.: US 10,684,910 B2
(45) Date of Patent: Jun. 16, 2020

(54) INTELLIGENT RESPONDING TO ERROR SCREEN ASSOCIATED ERRORS

(71) Applicant: International Business Machines Corporation, Armonk, NY (US)

(72) Inventors: Kwan Yin Andrew Chau, New South Wales (AU); Tony Le, New South Wales (AU); Patrick Wong, New South Wales (AU); Dien D. Nguyen, New South Wales (AU)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 15/955,058

(22) Filed: Apr. 17, 2018

(65) Prior Publication Data

US 2019/0317850 A1 Oct. 17, 2019

(51) Int. Cl.
*G06F 11/00* (2006.01)
*G06F 11/07* (2006.01)
(Continued)

(52) U.S. Cl.
CPC ............ *G06F 11/0793* (2013.01); *G06F 8/61* (2013.01); *G06F 8/65* (2013.01); *G06F 11/0769* (2013.01); *G06F 40/30* (2020.01); *G06K 9/6201* (2013.01); *G06K 9/6268* (2013.01); *G06K 9/66* (2013.01); *G06N 20/00* (2019.01)

(58) Field of Classification Search
CPC ............... G06F 11/0769; G06F 11/079; G06F 11/0793; G06F 11/3438; G06F 11/3466; G06F 11/366
See application file for complete search history.

(56) References Cited

U.S. PATENT DOCUMENTS

| 8,074,119 B1 * | 12/2011 | Rao | G06F 8/20 |
| | | | 714/38.1 |
| 8,677,194 B2 * | 3/2014 | Brodeur | G06F 11/0748 |
| | | | 714/38.14 |

(Continued)

FOREIGN PATENT DOCUMENTS

WO WO 2014049319 A1 4/2014

OTHER PUBLICATIONS

P. Mell, et al. *"The NIST Definition of Cloud Computing"*, NIST Special Publication 800-145, Sep. 2011, Gaithersburg, MD.

(Continued)

*Primary Examiner* — Elmira Mehrmanesh
(74) *Attorney, Agent, or Firm* — William Hartwell, Esq.; George S. Blasiak, Esq.; Heslin Rothenberg Farley & Mesiti PC

(57) ABSTRACT

Methods, computer program products, and systems are presented. The method computer program products, and systems can include, for instance: obtaining iteratively captured frames of image data representing a user interface screen, wherein one or more of the frames of image data represents an error screen indicating an error condition of one or more resource of a plurality of resources of a services system; performing recognition processing using image data of the captured frames of image data to determine an error classifier associated to the error screen: determining one or more action based on the error classifier; and performing the one or more action in response to the determining.

20 Claims, 12 Drawing Sheets

(51) Int. Cl.
    *G06F 8/65*         (2018.01)
    *G06F 8/61*         (2018.01)
    *G06K 9/66*        (2006.01)
    *G06K 9/62*        (2006.01)
    *G06N 20/00*      (2019.01)
    *G06F 40/30*      (2020.01)

(56) References Cited

U.S. PATENT DOCUMENTS

| | | | |
|---|---|---|---|
| 88,130,309 | * | 8/2014 | Maczuba ............ G06F 11/3688 717/128 |
| 8,964,858 | B2 | 2/2015 | Boyes et al. |
| 9,026,856 | B2 * | 5/2015 | Hecox ................ G06F 11/0793 714/38.1 |
| 9,131,241 | B2 | 9/2015 | Ji et al. |
| 9,424,170 | B2 * | 8/2016 | Chamberlain ...... G06F 11/3636 |
| 10,025,695 | B2 * | 7/2018 | Cai ........................... G06F 8/38 |
| 10,110,453 | B2 * | 10/2018 | Horiyama ........... H04L 43/0823 |
| 10,289,465 | B2 * | 5/2019 | Packham ............ G06F 11/0775 |
| 10,354,009 | B2 * | 7/2019 | Liang .................. G06F 17/2785 |
| 2009/0182794 | A1 * | 7/2009 | Sekiguchi ........... G06F 11/0748 |
| 2015/0382045 | A1 | 12/2015 | Pham et al. |
| 2016/0255139 | A1 * | 9/2016 | Rathod ................... H04L 67/10 709/203 |
| 2017/0161243 | A1 * | 6/2017 | Manoraj ............. G06F 17/2288 |
| 2018/0113867 | A1 * | 4/2018 | Erpenbach .............. G06F 17/21 |
| 2018/0173698 | A1 * | 6/2018 | Dubey ................ G06F 16/3347 |
| 2019/0108486 | A1 * | 4/2019 | Jain ...................... G06Q 10/101 |
| 2019/0266070 | A1 * | 8/2019 | Bhandarkar ........ G06F 11/0751 |

OTHER PUBLICATIONS

R. Fernald, *"Video Gross Error Detection"* Intel Software, Developer Zone, https://software.intel.com/en-us/articles/video-gross-error-detection, Feb. 9, 2012.

A.L. Samuel *"Some Studies in Machine Learning Using the Game of Checkers,"* IBM Journal, vol. 3, No. 3, Jul. 1959.

* cited by examiner

US 10,684,910 B2

INTELLIGENT RESPONDING TO ERROR SCREEN ASSOCIATED ERRORS

BACKGROUND

The present disclosure relates to artificial intelligence (AI) and computer machine learning and particularly to a computer implemented system for management of actions in response to errors associated to error screens.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed (Samuel).

SUMMARY

Shortcomings of the prior art are overcome, and additional advantages are provided, through the provision, in one aspect, of a method. The method can include, for example: obtaining iteratively captured frames of image data representing a user interface screen, wherein one or more of the frames of image data represents an error screen indicating an error condition of one or more resource of a plurality of resources of a services system; performing recognition processing using image data of the captured frames of image data to determine an error classifier associated to the error screen indicating an error condition of one or more resource of a plurality of resources of a services system, wherein the performing recognition processing includes using historical data of a data repository, the historical data including data of past errors of the services system; determining one or more action based on the error classifier, wherein the determining includes using a decision data structure that cognitively maps, for first through Nth error classifiers, an error classifier to at least one action associated to the error classifier; and performing the one or more action in response to the determining, wherein the one or more action is an action for correction of the error condition indicated by the error screen indicating an error condition of one or more resource of a plurality of resources of a services system.

In another aspect, a computer program product can be provided. The computer program product can include a computer readable storage medium readable by one or more processing circuit and storing instructions for execution by one or more processor for performing a method. The method can include, for example: obtaining iteratively captured frames of image data representing a user interface screen, wherein one or more of the frames of image data represents an error screen indicating an error condition of one or more resource of a plurality of resources of a services system; performing recognition processing using image data of the captured frames of image data to determine an error classifier associated to the error screen indicating an error condition of one or more resource of a plurality of resources of a services system, wherein the performing recognition processing includes using historical data of a data repository, the historical data including data of past errors of the services system; determining one or more action based on the error classifier, wherein the determining includes using a decision data structure that cognitively maps, for first through Nth error classifiers, an error classifier to at least one action associated to the error classifier; and performing the one or more action in response to the determining, wherein the one or more action is an action for correction of the error condition indicated by the error screen indicating an error condition of one or more resource of a plurality of resources of a services system.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining iteratively captured frames of image data representing a user interface screen, wherein one or more of the frames of image data represents an error screen indicating an error condition of one or more resource of a plurality of resources of a services system; performing recognition processing using image data of the captured frames of image data to determine an error classifier associated to the error screen indicating an error condition of one or more resource of a plurality of resources of a services system, wherein the performing recognition processing includes using historical data of a data repository, the historical data including data of past errors of the services system; determining one or more action based on the error classifier, wherein the determining includes using a decision data structure that cognitively maps, for first through Nth error classifiers, an error classifier to at least one action associated to the error classifier; and performing the one or more action in response to the determining, wherein the one or more action is an action for correction of the error condition indicated by the error screen indicating an error condition of one or more resource of a plurality of resources of a services system.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
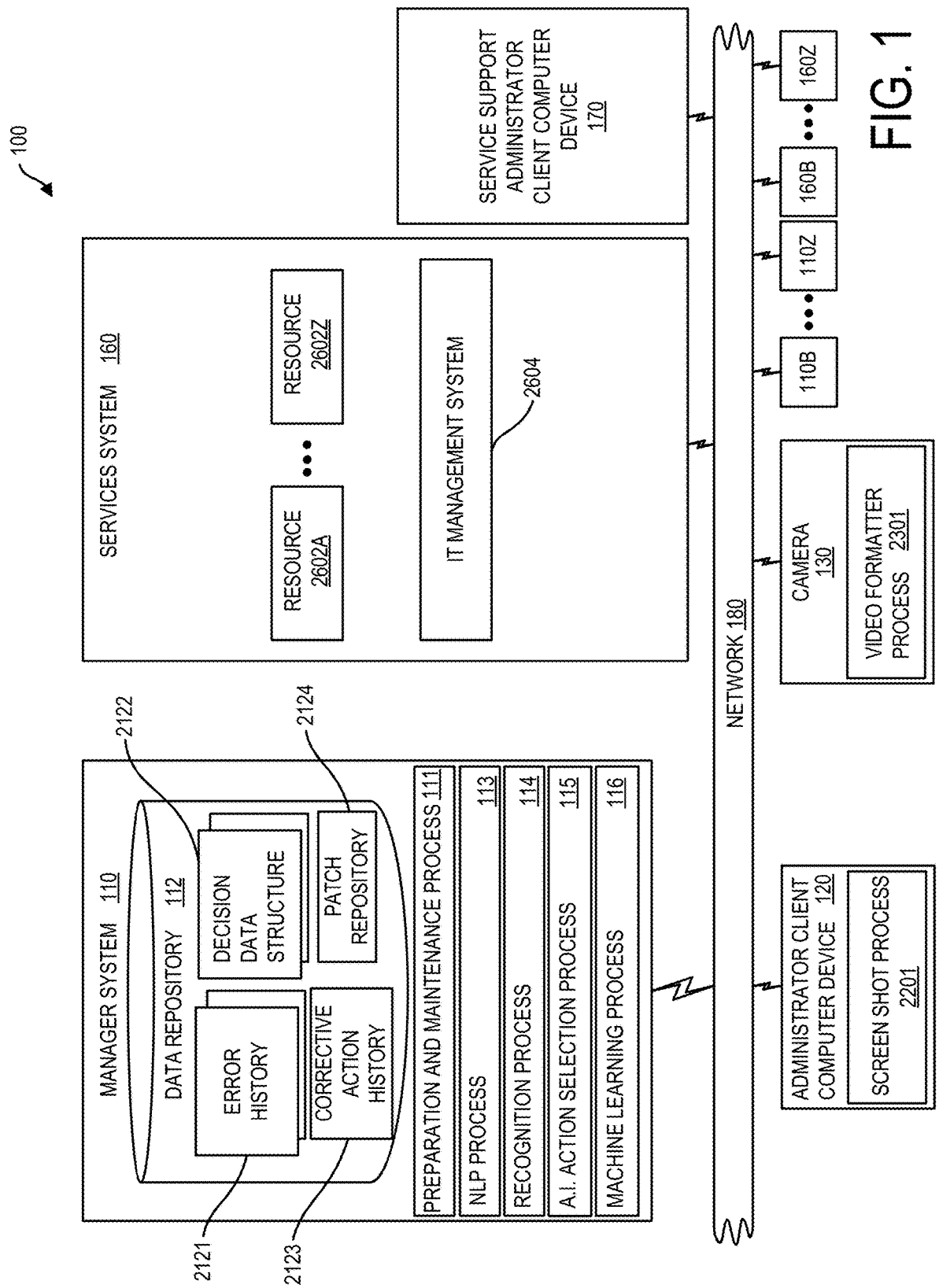
FIG. 1 is a system block diagram having a manager system and a service system according to one embodiment.

System 100 for use in managing action in response to an error screen is illustrated in FIG. 1. System 100 can include manager system 110 having an associated data repository 112, services system 160, and service support administrator client computer device 170. The system can further include administrator client computer device 120 and camera 130. Manager system 110, services system 160, administrator client computer device 120, and camera 130 are in communication with one another via network 180.

System 100 can include numerous devices, which may be computer node-based devices connected via network 180. Network 180 can be a physical network and/or a virtual network. The physical network can be, for example, a physical telecommunications network connecting numerous computer nodes or systems, such as computer servers and computer clients. The virtual network can, for example, combine numerous physical network or parts thereof into a logical virtual network. In another example, numerous virtual networks can be defined over a single physical network.

In one embodiment, manager system 110 can be external to services system 160. In another embodiment, manager system 110, services system 160, service support administrator client computer device 170, administrator client computer device 120, and camera 130 can be external to one another. In yet another embodiment, one or more of manager system 110, services system 160, service support administrator client computer device 170, administrator client computer device 120, and camera 130 can be co-located with one another.

In one embodiment system 100 can include second to Zth manager systems 110B-110Z. In one embodiment, system 100 can include second to Zth services systems 160B-160Z. In one embodiment services system 160 can include resources 2602A through 2602Z, and one or more IT management system 2604. Resources of resources 2602A-2602Z can include e.g. applications and/or computing nodes running such applications. Applications running on computing nodes can configure such computing nodes as servers, such as, e.g., web servers, mail servers, database servers, realtime communication servers, artificial intelligence (AI) servers, FTP servers, and/or collaboration servers. One or more IT management system 2604 of services system 160 can run on resources of resources 2602A-2602Z. One or more IT management systems 2604 can include, in one embodiment, IT management systems of different types.

IT management system 2604, in one embodiment, can be provided by an application performance management (APM) system. An APM system can monitor and manage performance and availability of software applications. An APM can detect and diagnose complex application performance problems to maintain an expected level of service. One example of an application performance metric that can be tracked using an APM IT management system is an application response time under peak load. APM can also measure resources used by an application for a load, e.g., indicating whether there is adequate capacity to support the load, as well as possible locations of performance bottlenecks. Response times for components of applications can be monitored to help identify causes of a delay. An APM can provide user experience monitoring, e.g., user experience monitoring, application runtime monitoring, and user-defined transaction profiling.

In one embodiment, IT management system 2604 can include an IT management system that monitors system-level functionalities, such as CPU usage and frequency, the amount of free RAM space, the amount of space on one or more hard drives, CPU temperature, IP address utilization (such as current rates of uploads and downloads), system uptime and downtime, hard drive parameter data, and voltages being provided by a power supply. One commercially available for use in providing an IT management system is IBM® Tivoli IT Management System, available from International Business Machines Corporation, of Armonk, N.Y., USA (IBM® and Tivoli® are registered trademarks of International Business Machines Corporation).

In one embodiment, IT management system 2604 can include an event monitoring IT management system. Events that can be monitored can include, for example, overloading events, out-of-memory events, VM migration events. An example of a commercially available event IT management system for managing events is IBM® OMNIbus®, available from International Business Machines Corporation (IBM® and OMNIbus® are registered trademarks of International Business Machines Corporation).

In one embodiment, IT management system 2604 can include an event logging IT management system. An event logging IT management system can perform logging of events from e.g. applications, network devices, operating systems, and containers. An example of a commercially available event logging IT management system is the open source GRAYLOG™ event logging IT management system available from Graylog, Inc. (GRAYLOG is a trademark of Graylog, Inc.).

In one embodiment, services system 160 administrator client computer device 120 and camera 130 can be utilized by a common enterprise. In one embodiment, services system 160 can be provided by software services provider, and made available for use by an enterprise by subscription. An enterprise can subscribe to various services available within services system 160 and have access to a subset of resources within services system 160, namely the depicted resources 2602A-2602Z, which are available for use by an enterprise. Example services can include e.g. hosting services, data storage service, image recognition services, artificial intelligence services. In such an embodiment, an administrator associated to administrator client computer device 120 can be an administrator of the enterprise subscribing to a subset of services of the services system.

System 100 can generate error screens that appear on the display of administrator client computer device 120, depicting a range of problems involving functionalities of first through Zth resources of the resources 2602a-2602z that are accessible and subscribed to by the enterprise. Error screens displayed on a display of administrator client computer device 120 can depict errors in one or more resource or resources 2602a-2602z. Error screens can be generated by resources of resources 2602A-2602Z including by applications running on one or more computing node. Error screen types can include for example: (a) a web browser error screen, including an error screen that directs to a 404 page; (b) an error dialog error screen that specifies a dialog of errors; (c) a screen glitch error screen, (d) a component positioning error screen wherein a screen component is rendered at an incorrect location; (e) functional error screen characterized by improper functioning of an application (a search engine search for "apples" returns "oranges").

Manager system 110 can be configured to process image data representations of such error screens displayed on a display of administrator client computer device 120. Manager system 110 can provide one or more output in response to a processing of an error screen.

Manager system 110 can run various processes, including preparation and maintenance process, natural language processing, an NLP process 113, recognition process 114, artificial intelligence (AI) action selection process 115, and machine learning process 116.

Data repository 112 can store various data. In error history area 2121 data repository 112 can store data on previously registered error screens. Error history area 2121 can store data representing past registered error screens as well as data on administrator activity events associated to the error screens. Administrator activity events data can define context data associated to error screens. Such context data can facilitate recognition of errors associated to error screens. In area 2122, data repository 112 can store one or more decision data structure. A stored decision data structure can include, e.g. a knowledgebase that maps identifiers for error classifications to decisions associated to such identifiers. The action decisions can be iteratively updated by machine learning in one embodiment. In corrective action history area 2123, data repository 112 can store records specifying actions taken with respect to prior error screen errors having associated error screens. Patch repository 2124 of data repository 112 can store a library of software patches that are available for use in improving the performance of one or more resource of resources 2602A-2602Z. A software patch, as set forth herein, can include a piece of software designed to update the software program and/or supporting data to fix or improve the performance of a program and/or data of one or more resource of resources 2602a-2602z. As noted, with the use of manager system 110, one or more output can be provided in response to a recognition process.

Manager system 110 can run preparation and maintenance process 111 to automatically update data records of areas 2121, 2122, 2123, and 2124 of data repository 112. Collected data of areas 2121, 2122, 2123, and 2124 can support processes run by manager system 110.

Manager system 110 can run NLP process 113 to process data for preparation of records that are stored in data repository 112 and for other purposes. Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 can run recognition process 114 to determine a classification of an error associated to and resulting in display of a current error screen. Manager system 110 running recognition process 114 can include manager system 110 examining data representing an error screen and/or context data of an error screen. Manager system 110 running recognition process 114 to determine a classification of an error associated to an error screen can include manager system 110 recognizing a current error screen as a previously registered error screen and/or manager system 110 recognizing context data of an error screen as previously registered context data.

Manager system 110 running recognition process 114 can recognize a current error screen as a previously registered error screen based on one or more matching criterion being satisfied. Manager system 110 running recognition process 114 can recognize context data of an error screen as a previously registered error screen context data based on one or more matching criterion being satisfied. In one embodiment, a matching criterion can be satisfied when there is an identical match between a current error screen and a previously registered error screen. In one embodiment, a matching criterion can be satisfied when there is other than an identical match.

In one embodiment, manager system 110 running recognition process 114 to examine data representing error screen and/or context data of an error screen can include manager system 110 employing pattern recognition processing using one or more of e.g. feature extraction algorithms, classification algorithms, and/or clustering algorithms.

In one embodiment, manager system 110 running recognition process 114 to recognize an error screen as a previously registered error screen can include performing of digital image processing for determining that a matching criterion has been satisfied. Digital image processing can include, e.g., filtering, edge detection, shape classification and/or optical character recognition (OCR). Manager system 110 running recognition process can include, in one embodiment, activation of an NLP process 113 to identify a match between the current error screen and a previously registered error screen based on one or more output NLP parameters resulting from an NLP processing of a prior-registered error screen as compared to a current error screen. An NLP processing for facilitating performance of recognition process 114 can include use of topic based NLP process, wherein topics of a current error screen is compared to topic parameters of prior registered error screens for performance of recognition processing and matching.

At various stages of operation, manager system 110 can run a heuristic process e.g. for performing matching of current error screen to a previously registered error screen. In one embodiment, running of heuristic process can include generating a hash of image data defining a current error screen and comparing that generated hash to hashes of image data representing registered. In some embodiments, manager system 110 running recognition process can include running of heuristic process e.g. for comparing of a current error screen to a previously registered error screen.

Manager system 110 running recognition process 114 to determine a classification of an error associated to an error screen can include manager system 110 matching a current error screen as a previously registered error screen using one or more process set forth herein. According to one of more matching criterion, the matching can require a non-identical match or in some embodiment an identical match.

Manager system 110 running recognition process 114 to determine a classification of an error associated to an error screen can include manager system 110 matching context data of an error screen as previously registered context data. According to one of more matching criterion, the matching can require a non-identical match or in some embodiment an identical match. The context data can include administrator activity event context data associated to the event. The context event can be time window related to the error screen. For example, if an error screen is displayed at time T1, a time window of interest may be defined by the time window T0 through T2 where T0 is a time before time T1 and T2 is a time after T1. For examination of context data of an error screen manager system 110 running recognition process 114 can employ pattern recognition processing using one or more of e.g. feature extraction algorithms, classification algorithms, and/or clustering algorithms.

Manager system 110 running artificial intelligence (AI) action selection process 115 can select one or more action based on a classification of a current error screen as having a certain error classification. In one embodiment, manager system 110 running AI action selection process 115 can include manager system 110 using a decision data structure of decision data structure area 2122. Manager system 110 running AI action selection process 115 can include manager system 110 using decision data structure that cognitively maps error classifier identifiers. One or more actions that are specified in such a decision data structure can include, e.g. actions to install a patch on a particular software program running on one or more resource of resources 2602A-2602Z. One or more action can also include activation of a logging profile for logging data of one or more resource of resources 2602A-2602Z. An action specified in a decision data structure can also include other actions, e.g. system resets, system reboots, reconfigurations, and the like. Actions can further include notifications, e.g. to an enterprise administrator associated to administrator client computer device 120 and/ or to a support administrator associated to service support administrator client computer device 170.

Manager system 110 running machine learning process 116 can include application of training data to update actions specified in a decision data structure for use in running AI action selection process 115. The training can include training of a predictive model that predicts a best set of actions for responding to a current error screen. Training data can include, e.g. a set of three-tuples, each three-tuple comprising for instance the values $(a_i, s_i, t_i)$ where $a_i$ is an action instance, $s_i$ is a success level associated to the action instance, and $t_i$ is a time associated to an action instance.

Figure 2:
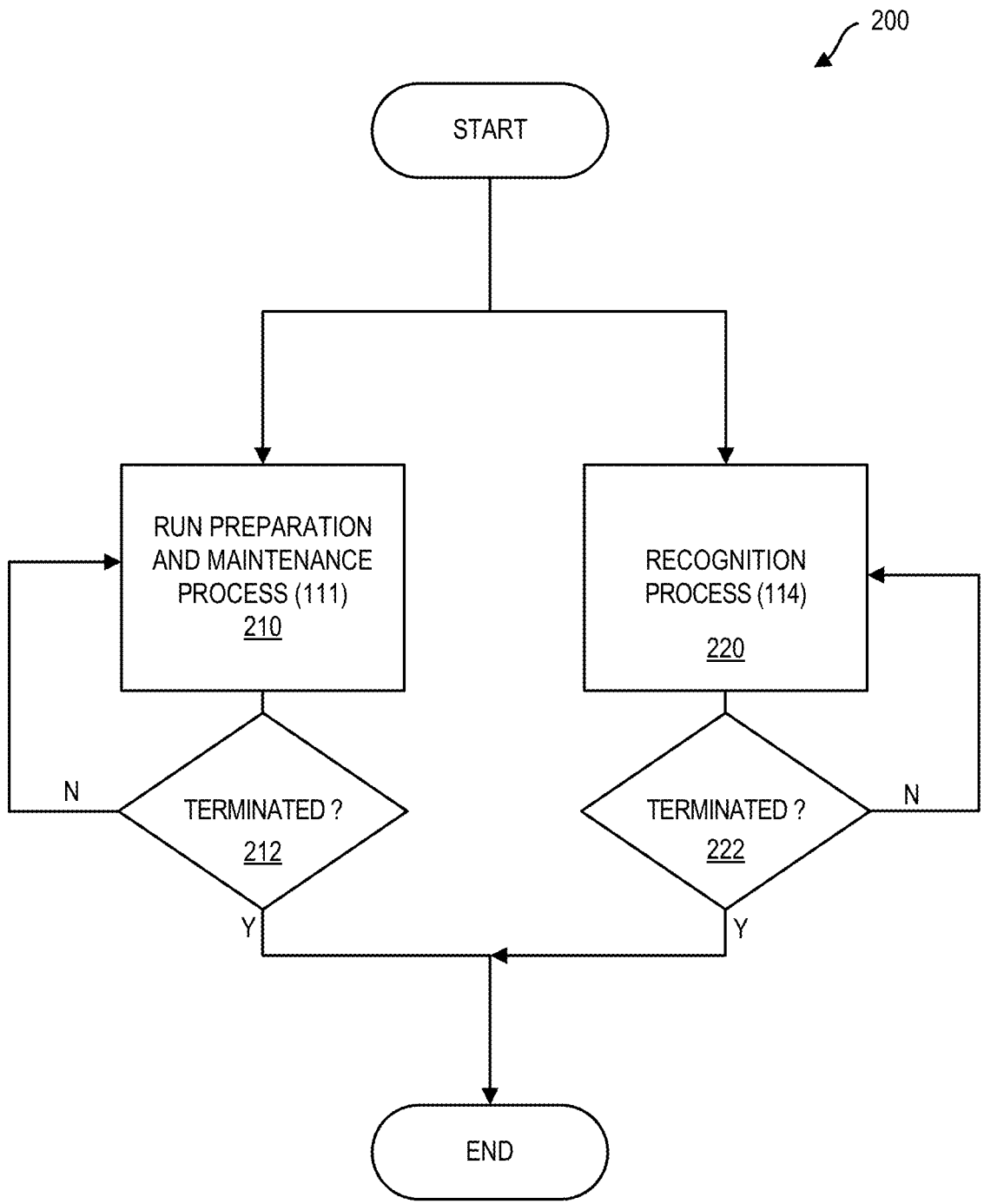
FIG. 2 is a flowchart illustrating a method that can be performed by a manager system according to one embodiment.

FIG. 2 is a flowchart illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of areas 2121-2124 of data repository 112. Manager system 110 can run preparation and maintenance process 111 iteratively until process 111 is terminated at block 212.

At block 220, manager system 110 can run recognition process 114 to determine error classifications for errors associated to error screens. For support of running of recognition process 114 iteratively, manager system 110 can be running e.g. NLP process 113, and A.I. action selection process 115 iteratively. Manager system 110 can run recognition process 114 until recognition process 114 is terminated at block 222. Manager system 110 can run preparation and maintenance process 111 and recognition process 114 concurrently and can run each of process 111 and process 114 iteratively NLP process 113 can be run e.g. to subject frames of image data to NLP processing to determine topic parameters associates to frames of image data for providing context data records for storage into error history area 2121.

Figure 3:
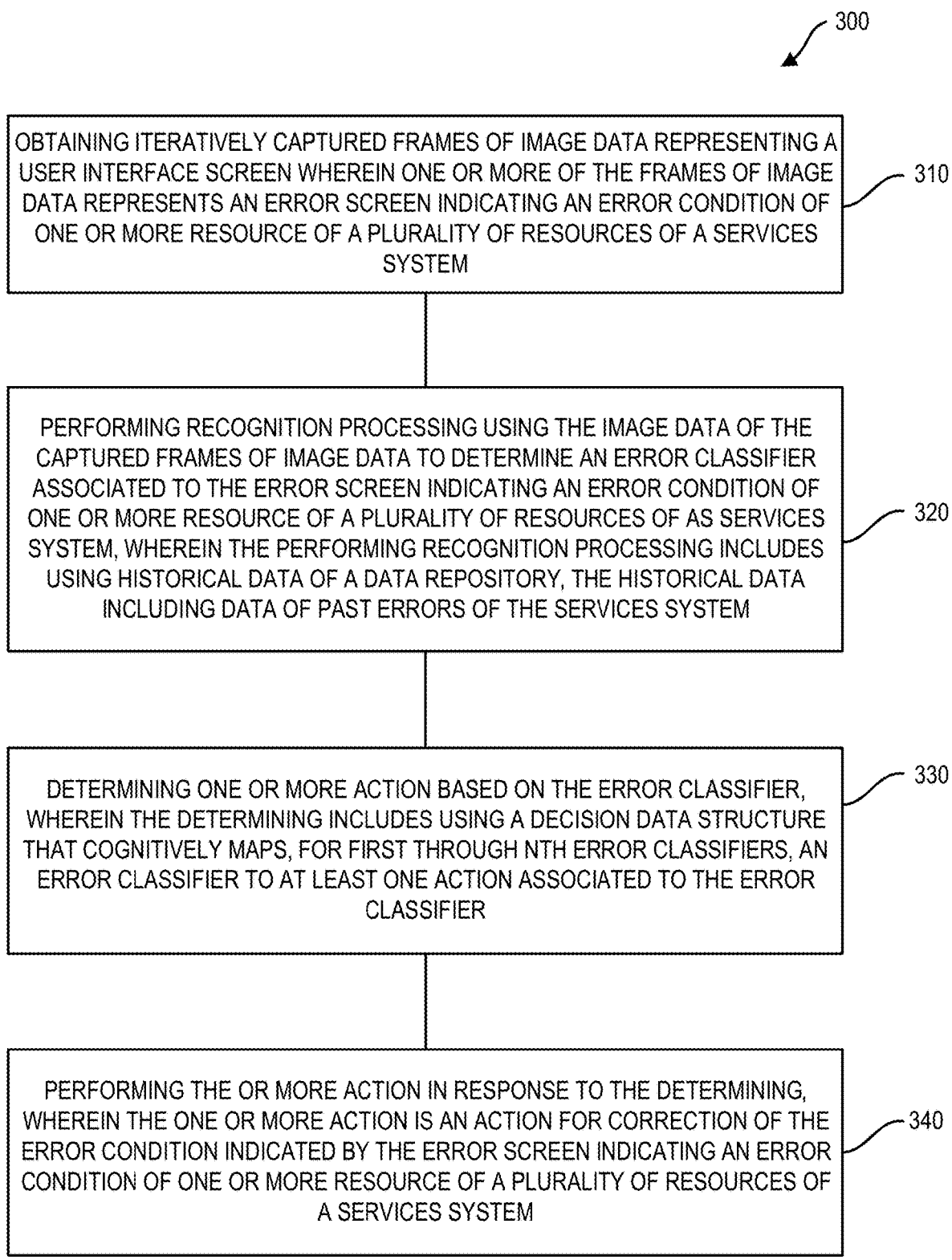
FIG. 3 is a flowchart illustrating a method that can be performed by a manager system according to one embodiment.

A method 300 for performance by manager system 110 is illustrated with reference to FIG. 3. At block 310, manager system 110 can perform obtaining iteratively captured frames of image data representing a user interface screen, wherein one or more of the frames of image data represents an error screen indicating an error condition of one or more resource of a plurality of resources of a services system. At block 320, manager system 110 can perform recognition processing using image data of the captured frames of image data to determine an error classifier associated to the error screen indicating an error condition of one or more resource of a plurality of resources of a services system, wherein the performing recognition processing includes using historical data of a data repository, the historical data including data of past errors of the services system. At block 330 manager system 110 can perform determining one or more action based on the error classifier, wherein the determining includes using a decision data structure that cognitively maps, for first through Nth error classifiers, an error classifier to at least one action associated to the error classifier. At block 340 manager system 110 can perform the one or more action in response to the determining, wherein the one or more action is an action for correction of the error condition indicated by the error screen indicating an error condition of one or more resource of a plurality of resources of a services system.

Figure 4:
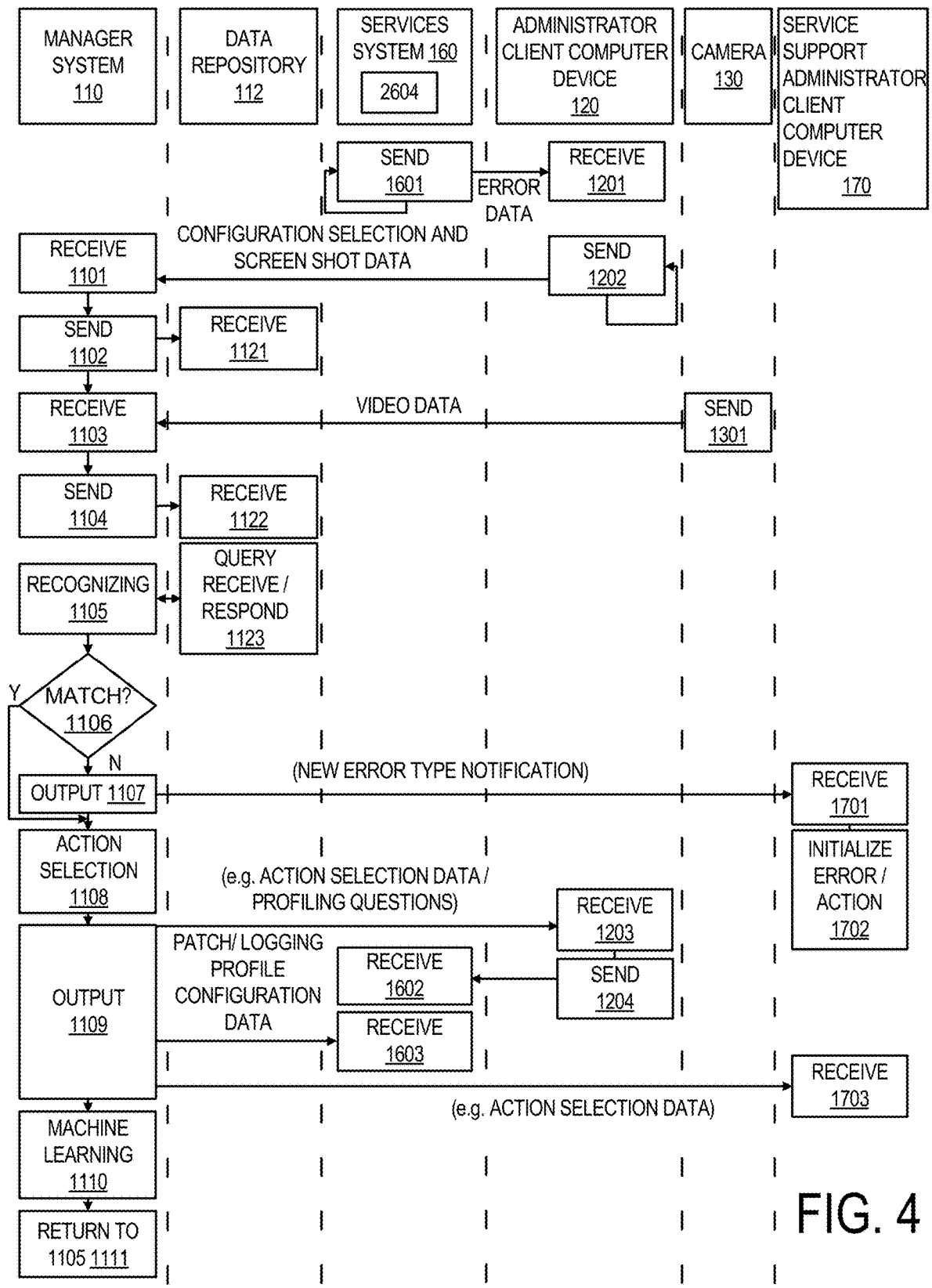
FIG. 4 is a flowchart illustrating a method that can be performed by a manager system interoperating with a services system, an administrator client computer device, a camera, and a support services administrator client computer device according to one embodiment.

A specific example of method 300 is set forth in reference to the flowchart of FIG. 4, illustrating a specific example of method 300 from the perspective of manager system 110 having an associated data repository 112, services system

160, administrator client computer device 120, camera 130, and service support administrator client computer device 170.

At block 1601 services system 160 can send error data to administrator client computer device 120 for receipt by administrator client computer device 120 at block 1201. During the performance of such sending an administrator using administrator client computer device 120 can be performing an operation with respect to one or more resource of resources 2602A-2602Z of services system 160. In response to receipt of the error data at block 1201, administrator client computer device 120 can display on a display thereof an error screen that indicates an error condition of the one or more resource.

Figure 5A:
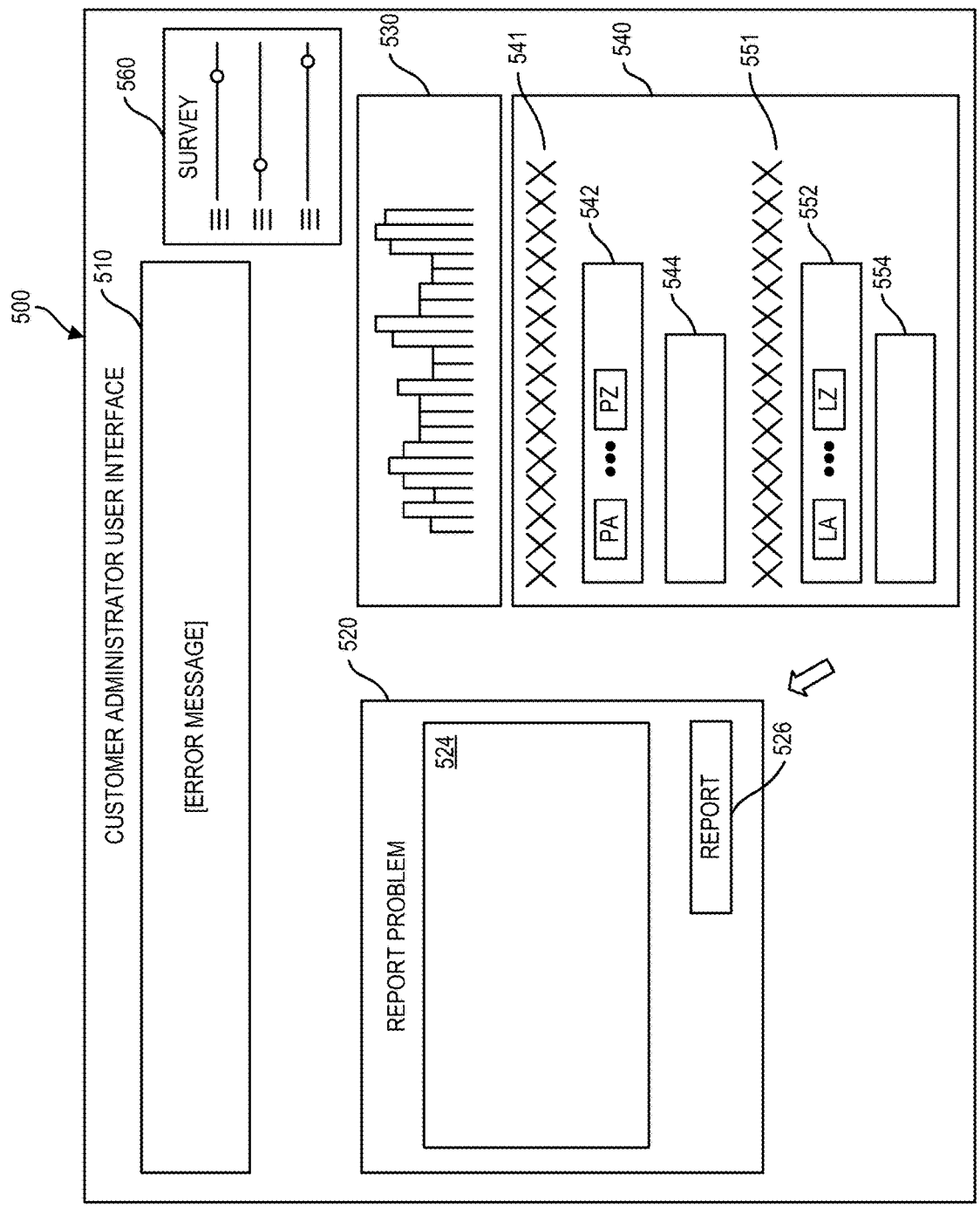
FIGS. 5A-5E depict an administrator user interface having variations of error screen areas according to one embodiment.

An exemplary administrator user interface 500 for display on a display of administrator client computer device 120, is shown in FIG. 5A. Administrator user interface 500 defines a user interface screen. Administrator user interface 500 can include an error history area 510 that defines the displayed user interface 500 as an error screen. In error history area 510, there can be displayed content that indicates an error. The content can include e.g. an error message. The error message can include e.g. text or describing a condition respecting e.g. an application of a resource of resources 2602A-2602Z.

In one embodiment, an error screen having an error message can be a user friendly error screen that provides text based information respecting a detected problem. In another embodiment, an error screen need not contain the user friendly text based message, but rather may include, e.g. merely an abnormal color, distortion, or something unexpected.

Figure 5B:
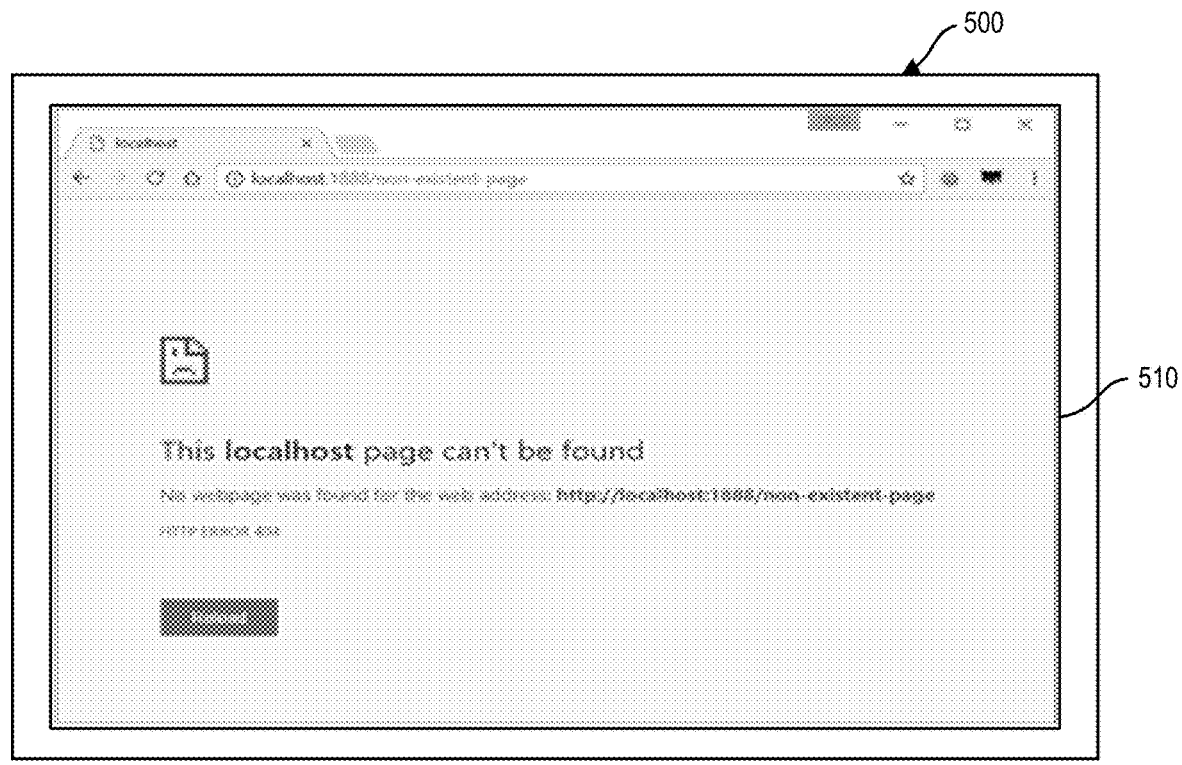
Figure 5C:
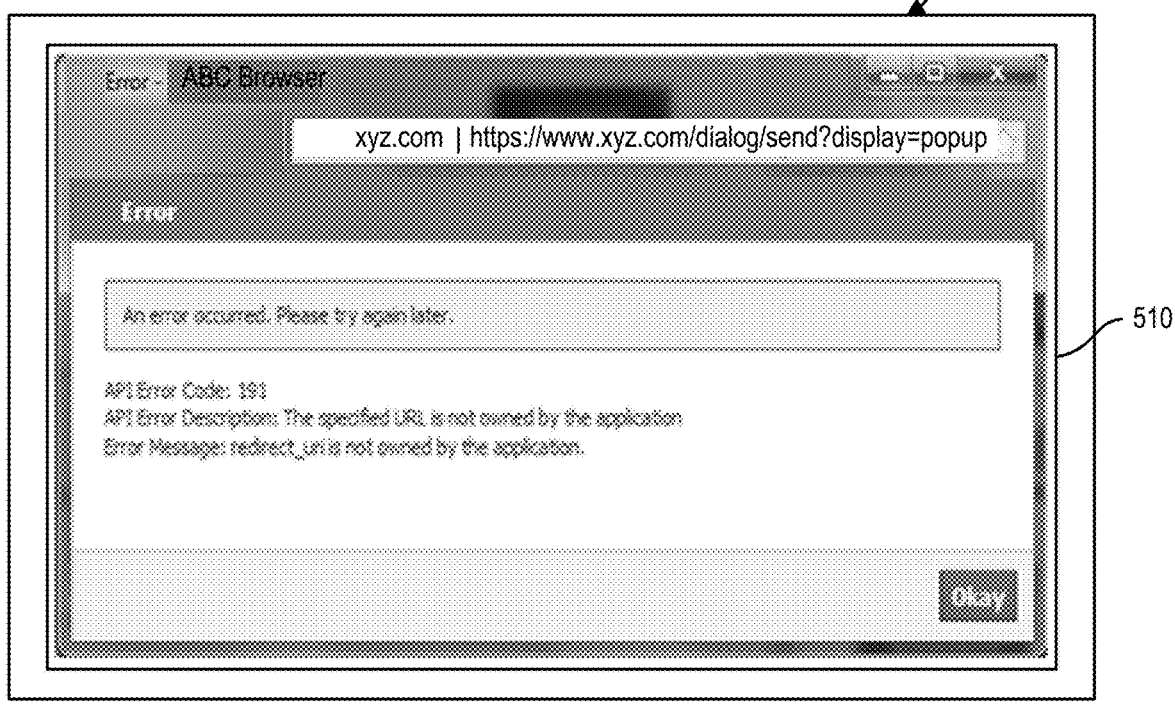
Figure 5D:
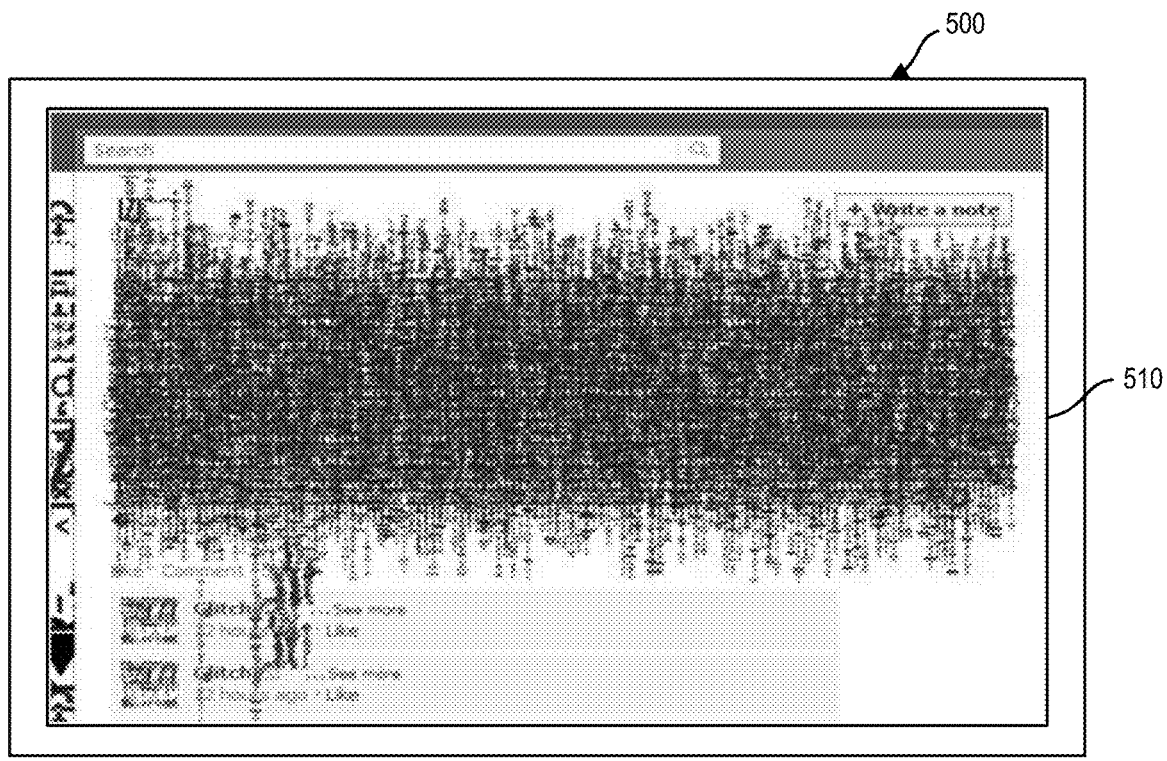
Figure 5E:
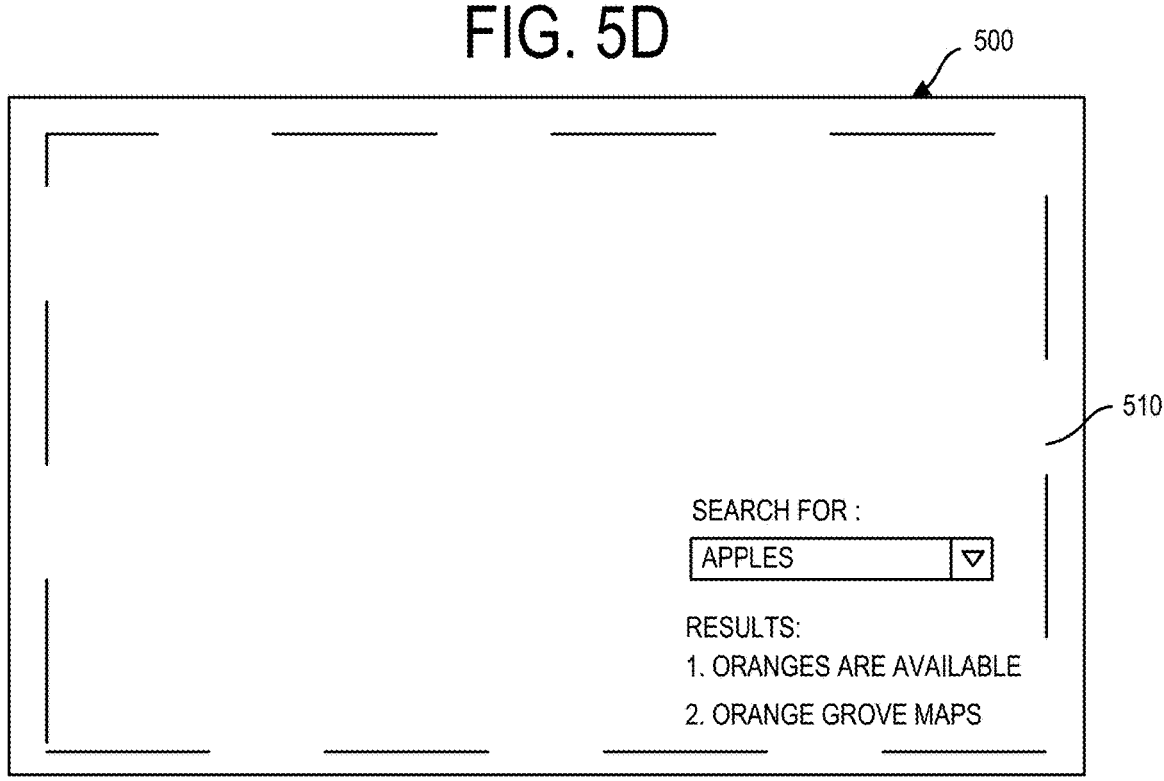

Error screens can be generated by resources of resources 2602A-2602Z including by applications running on one or more computing node. Error screen types can include for example: (a) a browser screen error screen (e.g. as depicted in FIG. 5B), including an error screen that directs to a 404 page; (b) an error dialog error screen (e.g. as depicted in FIG. 5C) that specifies a dialog of errors; (c) a screen glitch error screen e.g. as depicted in FIG. 5D; (d) a component positioning error screen as depicted in FIG. 5E wherein a screen component is rendered at an incorrect location (in FIG. 5E the search interface is configured to be centered but instead is displayed in a lower right portion of administrator user interface 500); (e) functional error screen also as depicted in FIG. 5E characterized by improper functioning of an application (a search engine search for "apples" returns "oranges").

At block 1202, administrator client computer device 120 can send to manager system 110 for receipt at block 1101 configuration selection data and screenshot data. Referring to administrator user interface 500, an administrator can be aware of a problem with respect to one or more resource of resources 2602A-2602Z and accordingly may use area 520 to report the problem. For example, an administrator may be aware of a problem based on the content of an error message depicted in area 510.

An administrator user can use area 524 to enter a text based description of an error associated to an error screen and may activate reporting using area 520 with button 526. Manager system 110 in response to the report activation can associate a ticket number to the reported error associated to an error screen. Manager system 110 in response to an error being reported can activate sending of image data provided by iteratively captured of screenshots of administrator user interface 500. The image data can include a succession of screen shot frames at least one of which can represent an error screen. Frames of the succession of screenshot frames can be taken at times earlier than a time at which an administrator user reports a problem. For example, in one embodiment manager system 110 can always be buffering a succession of screen shot frames, and then, when there is a problem reporting activation by an administrator user, a succession of frames at block 1202 can be sent to manager system 110.

The succession of frames can include frames captured within a time window of the error reporting activation. The time window can include times earlier than an error reporting activation time. In one example the time window T0-T2, where T1 is the error reporting activation time, T0 is earlier than T1 and is a time of the first frame of the succession of frames, and T2 is later than or equal to T1 and is the time of the last frame of the succession of frames. The iteratively captured image data provided by screenshot data on receipt by manager system 110 at block 1103 can be sent by manager system 110 at block 1122 for receipt and storage by data repository 112 at block 1122. Such stored image data can be stored e.g. error history area 2121 as context indicating a context of an error screen.

The iteratively captured screen shots with configuration selection data, e.g. of selection data to select a reported problem can be sent at block 1202 for receipt by manager system 110 at block 1101. In one embodiment, screenshot data can be passively received by manager system 110 at block 1101 without a problem reporting being activated by an administrator user. In such an embodiment, manager system 110 can passively process received screenshot data in the background without an administrator user performing reporting using administrator user interface 500.

In another aspect, image data representing an error screen and other user interface screens can be captured using an external image capture device, i.e. a camera 130. As depicted in FIG. 1, camera 130 can include a video formatter process 2301 for formatting captured image data into streaming video format. Camera 130 at block 1301 can send streaming video data to manager system 110 for receipt by manager system 110 at block 1103. Responsively, to receipt of the video data, manager system 110 at block 1104 can send received video data to data repository 112 for receipt and storage by data repository 112 at block 1122. Such stored image data can be stored e.g. error history area 2121 as context indicating a context of an error screen.

In one embodiment, manager system 110 can subject iteratively captured frame image data received at block 1101 and/or 1103 to further processing to enhance data representing error screens and user interface screens absent of error screen areas and to provide context data associated to error screen. For example, manager system 110 can subject timestamped frames of the successive image data frame screen shot frames and/or video frames to e.g. OCR processing to transform image data representations of text into machine readable text and then can further subject OCR processed frames to further processing e.g. by NLP process 113 to return topic classifications for each frame. Manager system 110 can append the provided context data to the iteratively captured frames and can store the context data with the image data into error history area 2121 of data repository 112. Data stored in error history area 2121 can be time stamped to facilitate time window processing. Context data associated to an error screen can include data other than data representing an error screen, e.g. can include data of or provided using image data frames representing user interface screens captured prior to time of a display of an error screen. Context data associated to an error screen can include administrator activity event context data that indicates activity events of an administrator used within a time window associated to an error screen.

Recognizing at block 1105 can include activation of recognition process 114 as set forth herein to classify an error associated to an error screen. Recognizing can include iterative queries of data repository 112 as depicted by query receive and respond block 1123 performed by data repository 112.

Recognizing at block 1105 to classify a current error associated to a current error screen can include examining of one or more of (a) error screen data representing an error screen or (b) context data associated to the error screen. Error screen data representing an error screen can include or be obtained using image data frames representing an error screen. Context data of an error screen can include or be obtained using image data frames representing user interface screens captured within a time window associated to an error screen. Such user interface screens can be absent of an error screen area e.g. can user interface screens indicating administrator user activity within a time window associated to an error screen, e.g. preceding display of an error screen.

Manager system 110 can run recognition process 114 to determine a classification of an error associated to and resulting in display of a current error screen. Manager system 110 running recognition process 114 can include manager system 110 examining data representing an error screen and/or context data of an error screen. Manager system 110 running recognition process 114 to determine a classification of an error associated to an error screen can include manager system 110 determining that a current error screen matches a previously registered error screen and/or manager system 110 determining that context data of a current error screen matches previously registered context data.

Manager system 110 running recognition process 114 can recognize a current error screen as a previously registered error screen based on one or more matching criterion being satisfied. Manager system 110 running recognition process 114 can recognize context data of an error screen as a previously registered error screen context data based on one or more matching criterion being satisfied. In one embodiment, a matching criterion can be satisfied when there is an identical match between a current error screen and a previously registered error screen. In one embodiment, a matching criterion can be satisfied when there is other than an identical match.

In one embodiment, manager system 110 running recognition process 114 to examine data representing error screen and/or context data of an error screen can include manager system 110 employing pattern recognition processing using one or more of e.g. feature extraction algorithms, classification algorithms, and/or clustering algorithms.

In one embodiment, manager system 110 running recognition process 114 to recognize an error screen as a previously registered error screen can include performing of digital image processing for determining that a matching criterion has been satisfied. Digital image processing can include, e.g., filtering, edge detection, shape classification and/or optical character recognition (OCR). Manager system 110 running recognition process can include, in one embodiment, activation of an NLP process 113 to identify a match between the current error screen and a previously registered error screen based on one or more output NLP parameters resulting from an NLP processing of a prior-registered error screen as compared to a current error screen. An NLP processing for facilitating performance of recognition process 114 can include use of topic based NLP process, wherein topics of a current error screen is compared to topic parameters of prior registered error screens for performance of recognition processing and matching.

At various stages of operation, manager system 110 can run a heuristic process e.g. for performing matching of current error screen to a previously registered error screen. In one embodiment, running of heuristic process can include generating a hash of image data defining a current error screen and comparing that generated hash to hashes of image data representing registered. In some embodiments, manager system 110 running recognition process can include running of heuristic process e.g. for comparing of a current error screen to a previously registered error screen.

Manager system 110 running recognition process 114 to determine a classification of an error associated to an error screen can include manager system 110 recognizing a current error screen as a previously registered error screen using one or more process set forth herein.

Manager system 110 running recognition process 114 to determine a classification of an error associated to an error screen can include manager system 110 recognizing context data of an error screen as previously registered context data. The context data can include administrator activity event context data associated to the event. The context event can be time window related to the error screen. For example, if an error screen is displayed at time T1, a time window of interest may be defined by the time window T0 through T2 where T0 is a time before time T1 and T2 is a time after T1. For examination of context data manager system 110 running recognition process 114 can employ pattern recognition processing using one or more of e.g. feature extraction algorithms, classification algorithms, and/or clustering algorithms.

Recognizing at block 1105 to classify a current error associated to a current error screen can include examining of one or more of (a) error screen data or (b) context data associated to the error screen data. Examining according to (a) can include determining that a current error screen matches a prior registered error screen according to a matching criterion wherein the current error screen and a prior error screen need not be identical. Examining according to (b) can include determining that an error associated to a current error screen matches a prior registered context data for the error according to a matching criterion wherein context data of the current error and the prior registered context data need not be identical.

Manager system 110 can employ various processes for determining that there is a match between a current error screen and a prior registered error screen. In one embodiment, manager system 110 running recognition process 114 can include performing of digital image processing for determining that a matching condition has occurred. Digital image processing can include, e.g., filtering, edge detection, and/or optical character recognition (OCR). Manager system 110 running recognition process 114 can include, in one embodiment, use of NLP parameters returned by activation of an NLP process 113 to identify a match between the current error screen and a previously registered error screen based on one or more output NLP parameters resulting from an NLP processing of a prior-registered error screen as compared to a current error screen. An NLP processing for facilitating performance of recognition process 114 can include use of topic based NLP process, wherein topics of a current error screen is compared to topic parameters of prior registered error screens for performance of recognition processing and matching. At various stages of operation, manager system 110 can run a heuristic process e.g. for performing matching of current error screen to a previously registered error screen. In one embodiment, running of heuristic process can include generating a hash of image data defining a current error screen and comparing that generated hash to hashes of image data representing registered. In some embodiments, manager system 110 running recognition process can include running of heuristic process e.g. for comparing of a current error screen to a previously registered error screen.

In some embodiments, for classifying an error associated to an error screen, manager system 110 can examine context data associated to an error screen. Error screen data stored in error history area 2121 of data repository 112 can include data representing an error screen and context data associated to an error screen. The context data can include e.g. administrator activity event context data associated to an error screen. The context data can include administrator activity event data associated to times within a time window related to the error screen. For example, if an error screen is displayed at time T1, a time window of interest associated to the error screen may be defined by the time window T0 through T2 where T0 is a time before time T1 and T2 is a time equal to or after T1. Data stored in error history area 2121 can be time stamped to facilitate time window processing. Context data associated to an error screen can include data other than data representing an error screen, e.g. can include data of or provided using image data frames captured prior to a time of a display of an error screen.

Context data subject to examining for classifying an error associated to an error screen can include data indicating administrator activity events within a time window associated to an error screen. Embodiment herein recognize that errors with services system resources such as resources 2602-2602Z can be classified as common where the error have common administrator activity events between the errors. Accordingly, for classifying an error associated to an error screen manager system 110 can examine administrator activity event context data to determine that there is a match between context data of a current error screen and prior registered context data. Such context data can be stored in error history area 2121 of data repository 112 by processes set forth herein and can include iterative timestamped frame image data, OCR output data, and/or NLP parameter data.

To illustrate error screen context data based error classification according one embodiment, manager system 110 can perform the following at block 1105: (i) iteratively captured frames received at block 1101 and/or 1103 can be examined as a set of frames comprising 1000 frames within the described time window T0 to T2 where an error screen is displayed at time T1: (ii) manager system 110 can recognize that in frame 9 the administrator user visited their favorites; (iii) manager system 110 can recognize that in frame 323 the user toggled a setting; (iv) manager system 110 can recognize that in frame 423 the user performed a search; (v) manager system 110 can recognize that beginning in frame 557 error screen ES008 was displayed.

Based on the administrator activity events, manager system 110 can search past error history area 2121 for past registered error context data matching the current error context data characterized by a sequence of administrator activity events comprising the events: (a) visiting favorites; (b) toggling setting; and (c) performing a search. In some embodiment, manager system 110 can filter results to exclude results where the error screen ES008 is not subsequently displayed on a display of administrator client computer device 120.

Manager system 110 can examine error history area 2121 and can identify prior registered context data wherein at frame 27 an administrator user visited a favorite, at frame 90 toggled settings and at frame 192 performed a search. Manager system 110 can determine that the prior registered error screen context data matches the current error screen context data based on the administrator activity event sequence (a) (b) and (c) being in common between the prior registered error screen context data and the current error screen context data.

Matching determinations can be qualified by a confidence level exceeding a threshold which confidence level can be based e.g. on the frame count variance between the prior registered error screen context data and the current error screen context data. Manager system 110 based on a determining that a current error screen context data matches prior error screen context data can assign an error classifier to the current error having an associated error screen.

Figure 6:
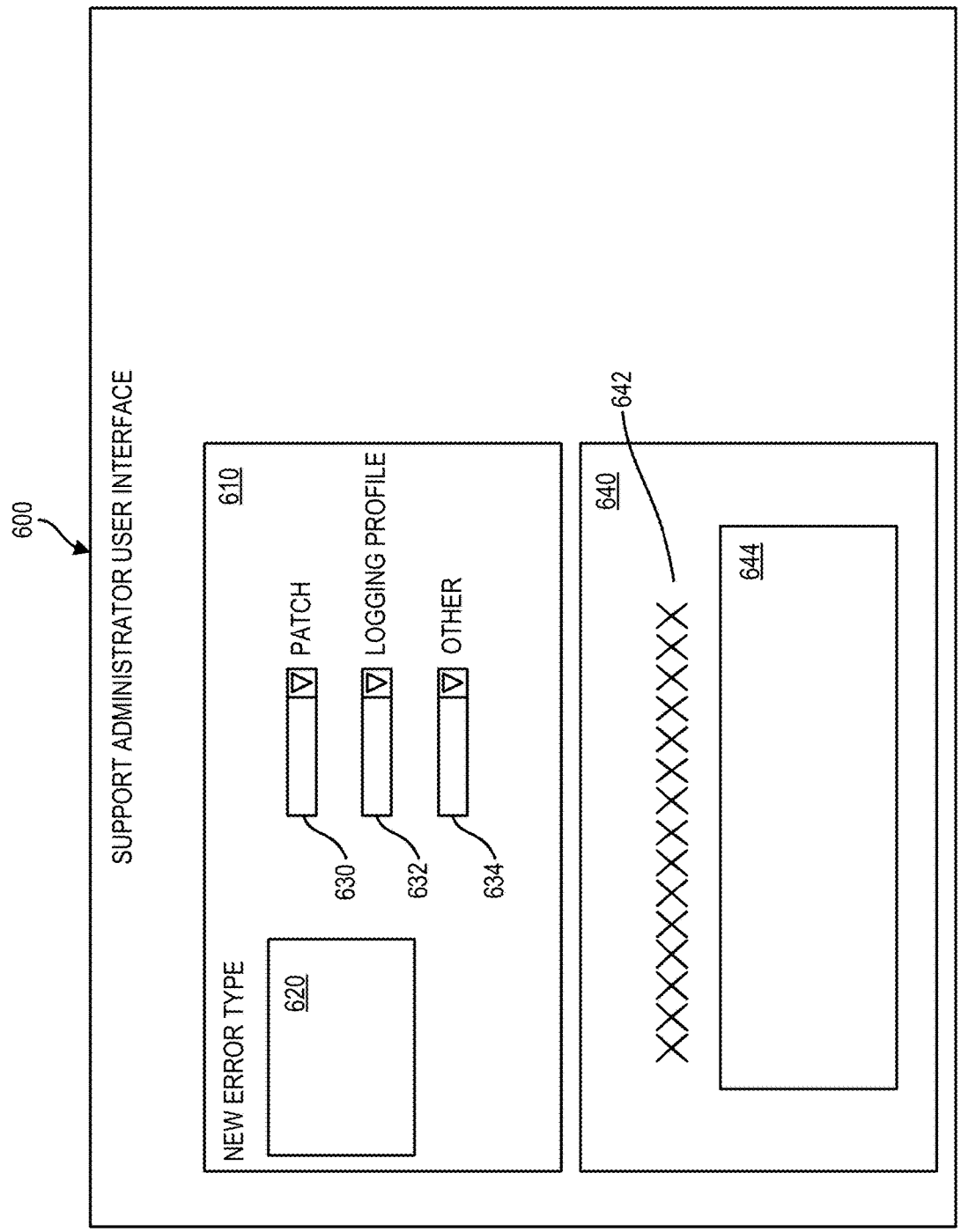
FIG. 6 depicts a support administrator user interface according to one embodiment.

Manager system 110 at block 1106 can determine whether a match has been identified between current error data and a previously registered error data, e.g. between a current error screen and/or context data and a prior registered error screen and/or error screen context data. Manager system 110 based on a match not being detected, can proceed to block 1107 to provide one or more output. The one or more output can be a new error type notification sent by manager system 110 at block 1107 for receipt by service support administrator client computer device 170 at block 1701. Based on the receipt of the new error type notification at block 1701, an administrator associated to service support administrator client computer device 170, an administrator user can use a support administrator user interface 600 as is depicted in FIG. 6 to specify data to initialize a new error classification for the new error specified in the notification received at block 1701, as well as an initial set of actions associated to the new error classification. Manager system 110 to register the new error as a registered error can assign a new error classifier identifier to the new error having error data stored in error history area 2121 (e.g. data representing an error screen and error screen context data) for which no prior matching error data was found. A registered error can have a registered error screen and registered context data stored in error history area 2121. Using error area 610 a support administrator using support administrator user interface 600 can observe a re-presentment of the current error screen in area 620 and/or context data associated to the error screen and using dropdown menu at 630 can specify one or more patch for association with the new error type. A support administrator user can specify one or more logging profile associated to the new error type using area 632 and using the dropdown menu at 632 a support administrator user can specify one or more other action associated to the new error classification.

Based on a matching being performed at block 1106 so that an error classifier is determined for an error, manager system 110 can proceed to block 1108 to perform action selection. System 100 can be configured so that action selection at block 1108 can also be performed in response to a support administrator user initializing a new error classification and actions at block 1702 using support administrator user interface 600. Manager system 110 can perform action selection at block 1108 using a decision data structure as set forth in Table A.

TABLE A

| ERROR | PATCH | LOGGING PROFILE | OTHER ACTION |
|---|---|---|---|
| E001 | P007; P009 | L004 | A002 |
| E002 | P002 | L003; L006 | A004 |
| E003 | — | L009; L007 | — |
| E004 | P003; P001; P006 | L003 | A002, A008 |
| . | . | . | . |
| . | . | . | . |
| . | . | . | . |

Table A depicts a cognitive mapping decision data structure that cognitively maps error classifications, e.g. error classifications identified by the identifiers E001, E002, E003, E004 to actions associated to the error classification. Various types of actions can be specified in the decision data structure including patch actions having identifiers in the form P00*, logging profile action identifiers having the form L00*, and other action identifiers having the form A00*. Referring to the decision data structure of Table A, manager system 110 on determining that a current error screen having an associated error classification classified by the classifier E003 and can return a decision to initiate patch P007 and logging profiles L009 and L007.

In the described example hereinabove wherein manager system 110 determines that a current error context data matches prior registered error context data based on the administrator activity event sequence (a), (b) and (c) being common between the error context data, manager system 110 can determine that the current error is the classified as error classification E002 that is specified in Table A. Manager system 110 can accordingly return the decision for action P002 to install a certain patch to correct the condition indicated by the error screen associated to an error. Manager system 110 can accordingly further return the decision for actions to activate the logging profiles L003, and L006 which are logging profiles to activate logging for "favorites" and logging for "search feature" respectively. Manager system 110 can accordingly also return the action A004 to send a text based message specifying that the administrator user re-perform the activity events (the favorites and search activities) preceding the error screen with logging now activated.

Other actions specified in the other actions column of the decision data structure of Table A can include e.g. a restart of an application of a resource of one or more resources 2602A-2602Z such as a web based application, or a restart of a microservice.

Manager system 110 at block 1109 can provide one or more output in response to the action selection by manager system 110 at block 1108. The one or more output at block 1109 can include manager system 110 sending text based action selection data and/or profiling questions for receipt by administrator client computer device 120 at block 1203. On receipt of action selection data at block 1203, administrator client computer device 120 can display in area 540 of administrator user interface 500 various data. For example, at 541 of area 540 administrator user interface 500 can display textual data describing aspects of a selected one or more patch selected at block 1108. Area 542 indicators for various patches can be displayed highlighting one or more patch selected by the action selection process at block 1108. Using area 544 an administrator user can specify an address, e.g. URL for the selected patch. In response to receipt of the action selection data at block 1203 there can also be displayed within area 540 of administrator user interface 500, a text based description of a selected logging profile selected by the performing of action selection at block 1108. In area 552 there can be displayed various icons for menu selection of a logging profile. With the selected logging profile, selected by the action selection at block 1108 being highlighted. Using area 554, and administrator user can designate an address, e.g. URL for performance of the logging profile activation. Area 540 depicts a guided automated selection in which an administrator user can enter manual controls into a user interface that are guided by the performance of action selection at block 1108. In some embodiments, manager system 110 can be configured to automatically implement in accordance with an action selection at block 1108 without a guided automatic selection using an administrator user interface, such as administrator user interface 500. For example, manager system 110 at block 1109 for providing one or more output in response to the performance of action selection at block 1108 can send one or more patch and one or more set of logging profile configuration data for receipt by services system 160 at block 1603 without any administrator user interaction with administrator user interface 500 for installing of the selected one or more patch and/or activating of the one or more logging profile.

Manager system 110 can in many use case scenarios automatically determines an address location (e.g. URL) to which to transmit a corrective patch for installation for correction of an indicated condition indicated by an error screen. For example, error screens commonly map to applications having software running on computing nodes with locations which can be readily tracked e.g. with use of one or more IT management system 2604. Manager system 110 can automatically send a patch for installation to an automatically determined installation location. The automatic sending can be on a guided automated basis or an unguided automatic basis (without any administrator user interaction with administrator user interface 500) for example.

Manager system 110 can in many use case scenarios automatically determine a location to which to transmit a corrective logging profile activation communication to activate a logging profile. For example, error screens commonly map to applications having software running on computing nodes with locations which can be readily tracked e.g. with use of one or more IT management system 2604. On recognition of an error, manager system 110 can automatically send a REST request to a log management system (e.g. Graylog) or the application itself to enable additional logging for that particular component. A logging profile action that is specified in a decision data structure as described in connection with Table A can be a logging profile to increase a specificity of a logging function. For example, according to a baseline logging function, logging operations for improved memory utilization may not log events mapped to particular user interface controls (e.g. hot buttons). However, according to a debug logging profile, user interface control specific events (e.g. mapping to a particular control button) can be tracked. A logging profile activation decision specified in a decision data structure, e.g. as shown in Table A can include a logging profile activation decision to activate a debug logging profile. A logging profile can be seen as a set of logging rules. For example, in the program code when a user clicks ButtonA with debug logging on, the message "user clicked ButtonA". Since a user may click ButtonA 1000 times a day avoiding logging such detail may be advantageous for improvement of memory utilization. In such an embodiment, system 100 can selectively provide such a log on the activation of a debug logging profile.

One or more output provided at block 1109 by manager system 110 can further include a communication by manager system 110 for receipt by services support administrator client computer device 170 at block 1703. Such a communication can include, e.g. text based action selection data which provides data on the action decision selection provided at block 1108. Such action selection data can include e.g. text based description of the action decisions returned with use of a decision data structure for display on a support user interface displayed on a display of services support administrator client computer device 170.

In response to received action selection data received at block 1703, support administrator user interface 600 as shown in FIG. 6 can display various content in area 640 of support administrator user interface 600. Such content can include, e.g. at 642 a text based description of the action selections resulting from performance of action selection block 1108. The support administrator user associated to service support administrator client computer device 170, accordingly has information of the action selections resulting from performance of block 1108. In area 644, there can be displayed, e.g. a face-to-face video communication channel to facilitate video communication between the support administrator at the service support administrator client computer device 170 and the enterprise administrator at administrator client computer device 120. Additionally, or alternatively, in area 644 there can be displayed a shared work screen facilitating further communication between administrators regarding the current error screen, displayed on a display of administrator client computer device 120. One or more output provided at block 1109 can include one or more output to activate performance evaluation if any action implemented based on the action selection at block 1108. The monitoring can include scoring of performance of the action based on various selected performance parameters, e.g. system down town, system run time. Such resource performance monitoring data can be obtained from one or more IT management system 2604.

One or more output to initiate a monitoring process for monitoring performance of a selected action selected at block 1108 can include manager system 110 sending a communication to administrator client computer device 120, so that a survey 560 is displayed on administrator user interface 500 as shown in FIG. 5. The displayed survey 560 can include various information input information areas that allow an administrator user using administrator user interface 500 to specify a success rating of the selected action, e.g. on a scale of 0 (not successful) to 10 (most successful). On the generating monitoring results data that specifies a success rating of a selected action, such data can be used to automatically update a decision data structure.

Figure 7:
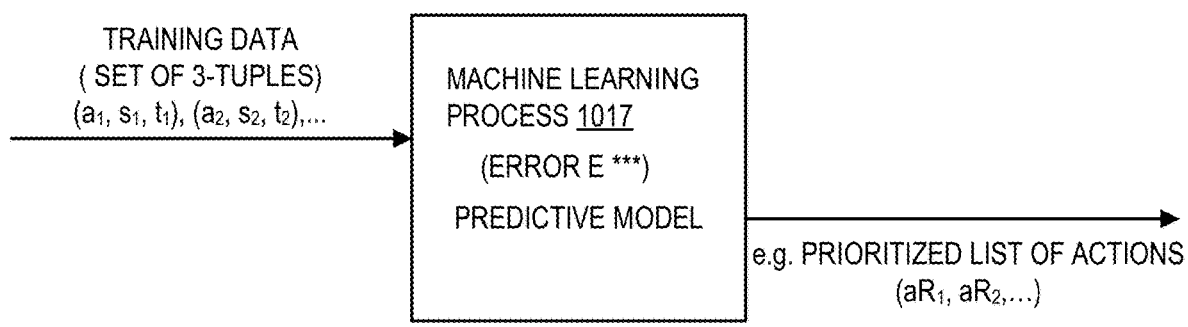
FIG. 7 is a block diagram illustrating performance of a machine learning process according to one embodiment.

With further reference to the flowchart of FIG. 4, machine learning can be performed at block 1110. Machine learning can include activation of machine learning process 116 as depicted in FIG. 1. Machine learning can include use of data resulting from the described performance monitoring to update data of a decision data structure. Iteratively, over time as additional data is obtained by system 100. FIG. 7 illustrates a predictive model that can be trained by activation of machine learning process 116 for updating actions specified in a decision data structure, such as the decision data structure as set forth in Table A. Depicted in FIG. 7, training data for training of predictive model can include inputting a set of three-tuples into machine learning process 1017. Each three-tuple can take the form of $(a_i, s_i, t_i)$ where $a_i$ is an action instance, $s_i$ is a success rating associated to the action instance, and $t_i$ is a time associated to the action instance.

The training data input into machine learning process 1017 can iterate as new data is made available. For example, where a certain error data (e.g. error screen data and/or context data thereof) is matched to a previously registered error screen and the error classified according to a classification actions can be selected for the classification and subsequent to the actions being implemented, performance of the actions can be monitored for the determining success ratings. On the return by system 100 of each new success rating parameter, manager system 110 can automatically apply updated training data to machine learning process 116 which can responsively update a predictive model for predicting a best performing set of actions for the certain error classification. Machine learning process 116 based on the applied training data can output a prioritized list of actions, e.g. the actions AR1, AR2, . . . . Where AR1 is the highest ranking action, AR2 is the second highest ranking action, and so forth according to a prioritized list of actions.

In one embodiment, machine learning process 116 can apply an algorithm so that the output prioritized list of actions can change based on input training data. In one embodiment the algorithm can provide a ranking of prioritized actions based on an average of success ratings for the various actions, in accordance with a function that uses the timestamp parameter of the training data to filter out aged data older than a threshold age.

Certain embodiments herein may offer various technical computing advantages involving computing advantages to address problems arising in the realm of computer networks. Embodiments herein can perform recognition processing to determine classification of errors associated to error screens indicating an error condition of one or more resource of a services system. One or more decision data structure can be used to return artificial intelligence (AI) decisions based on returned error classifiers. Machine learning processes can be employed, such as machine learning process to automatically update a decision data structure that cognitively maps error classifiers to actions associated to the error classifiers. Embodiments herein feature AI decision making processes for implementation of one or more corrective action in response to recognizing an error having an associated error screen. Corrective actions that can be implemented in response to recognizing an error can include, e.g. action for software patch installation and/or action for logging profile activation. Machine learning processes can be performed for increased accuracy and for reduction of reliance on rule based criteria and thus, reduced computational overhead. For enhancement of computation accuracies, embodiments can feature computational platforms existing only in the realm of computer networks such as artificial intelligence (AI) platforms and machine learning platforms. Embodiments herein can employ data structuring processes, e.g. processing for transforming unstructured data into a form optimized for computerized processing. Embodiments herein for recognizing a error screen can include, e.g. activation of a heuristic process and/or utilization of return data returned by subjecting of an error screen to natural language processing (NLP) processes. Embodiments herein recognize that with administrator users increasingly working remotely with respect to network resources, such administrator users are increasingly using administrator user computer devices that are mobile devices having small screens. Embodiments herein can feature simplified and reduced content, user interface control features, and in various embodiments can avoid processes involving manual input to enhance an administrator's ability to perform administrative activities with respect to a network using an administrator computer device provided by a mobile device having a small screen.

Figure 8:
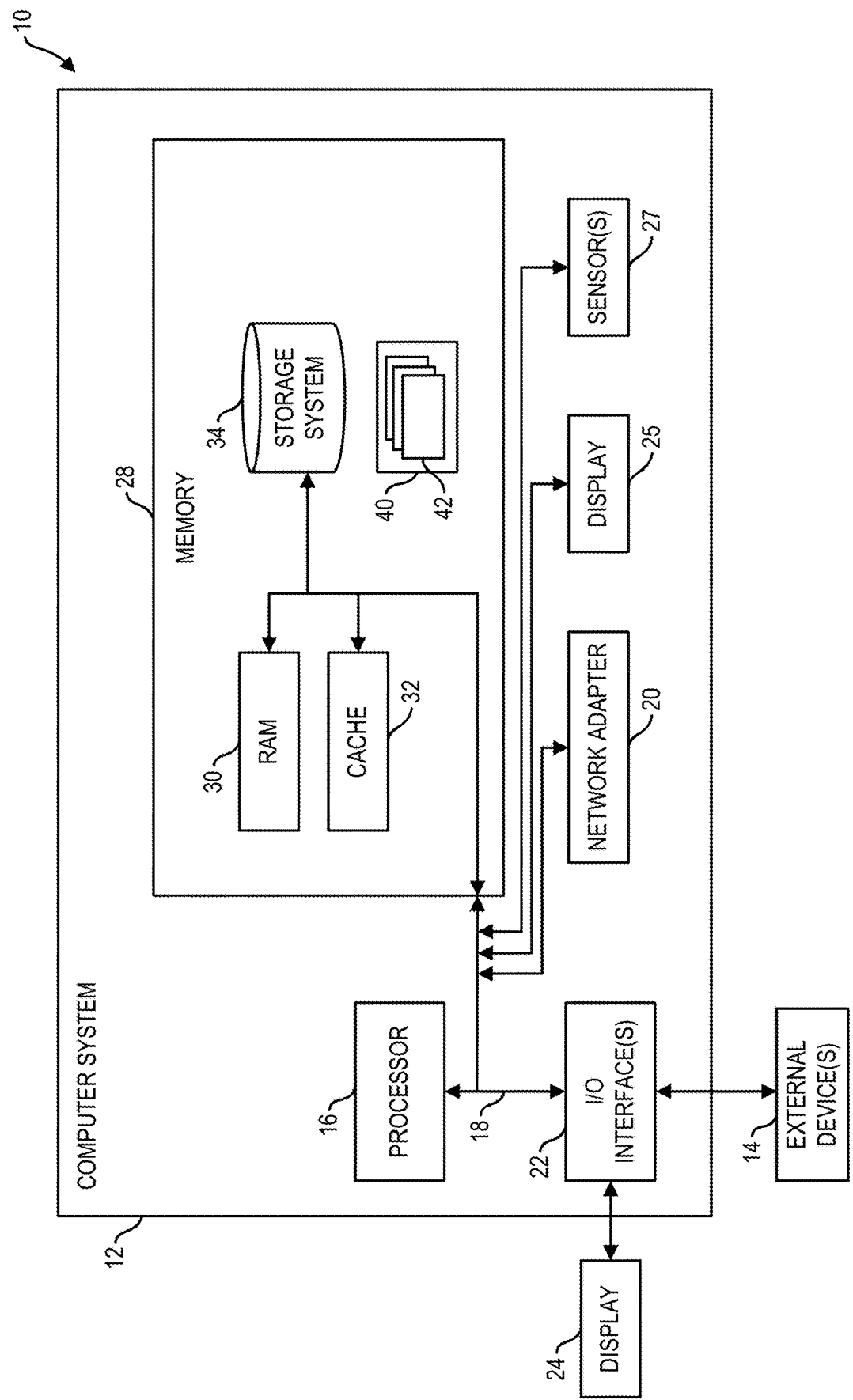
FIG. 8 depicts a computing node according to one embodiment.
Figure 9:
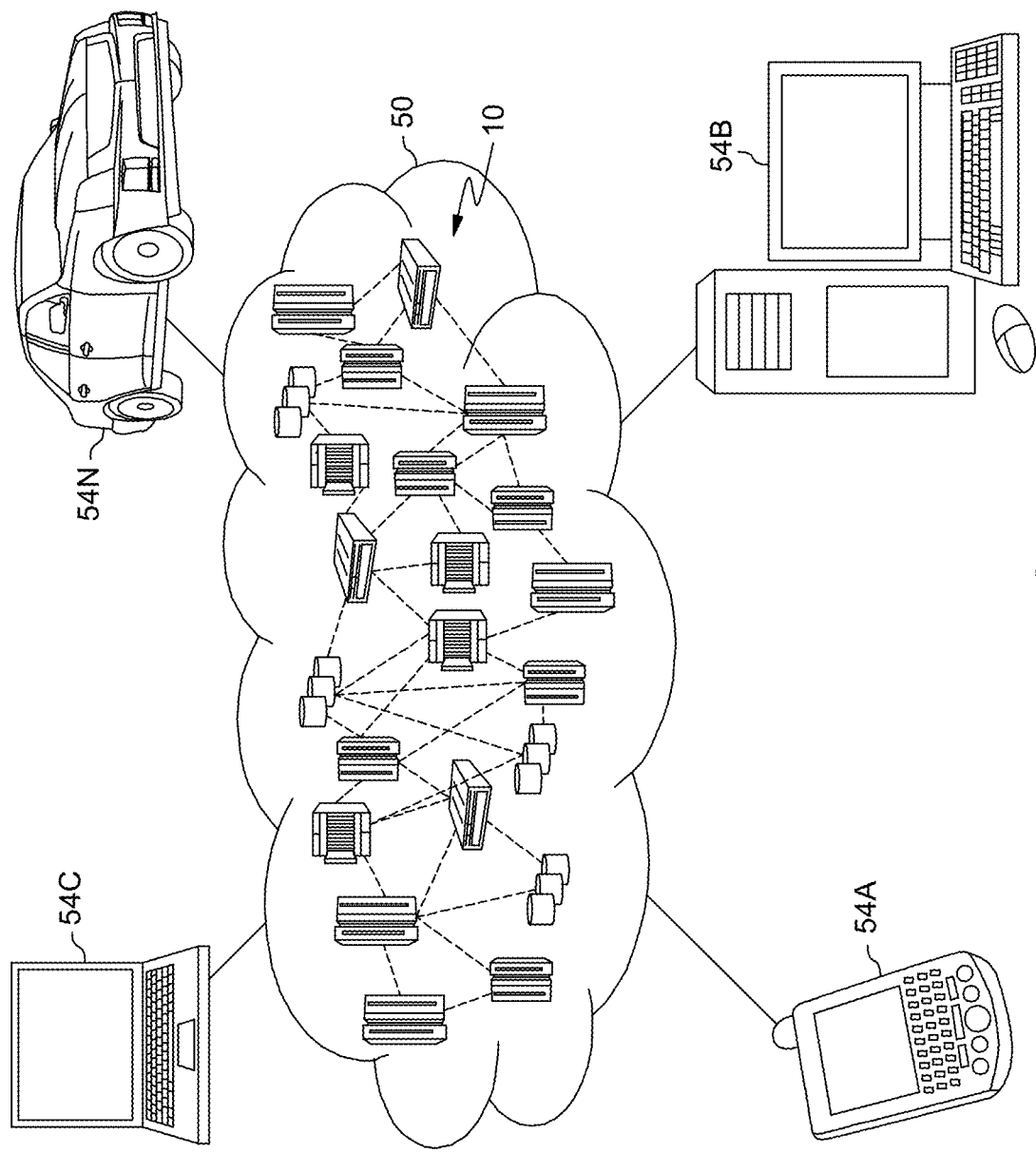
FIG. 9 depicts a cloud computing environment according to one embodiment.
Figure 10:
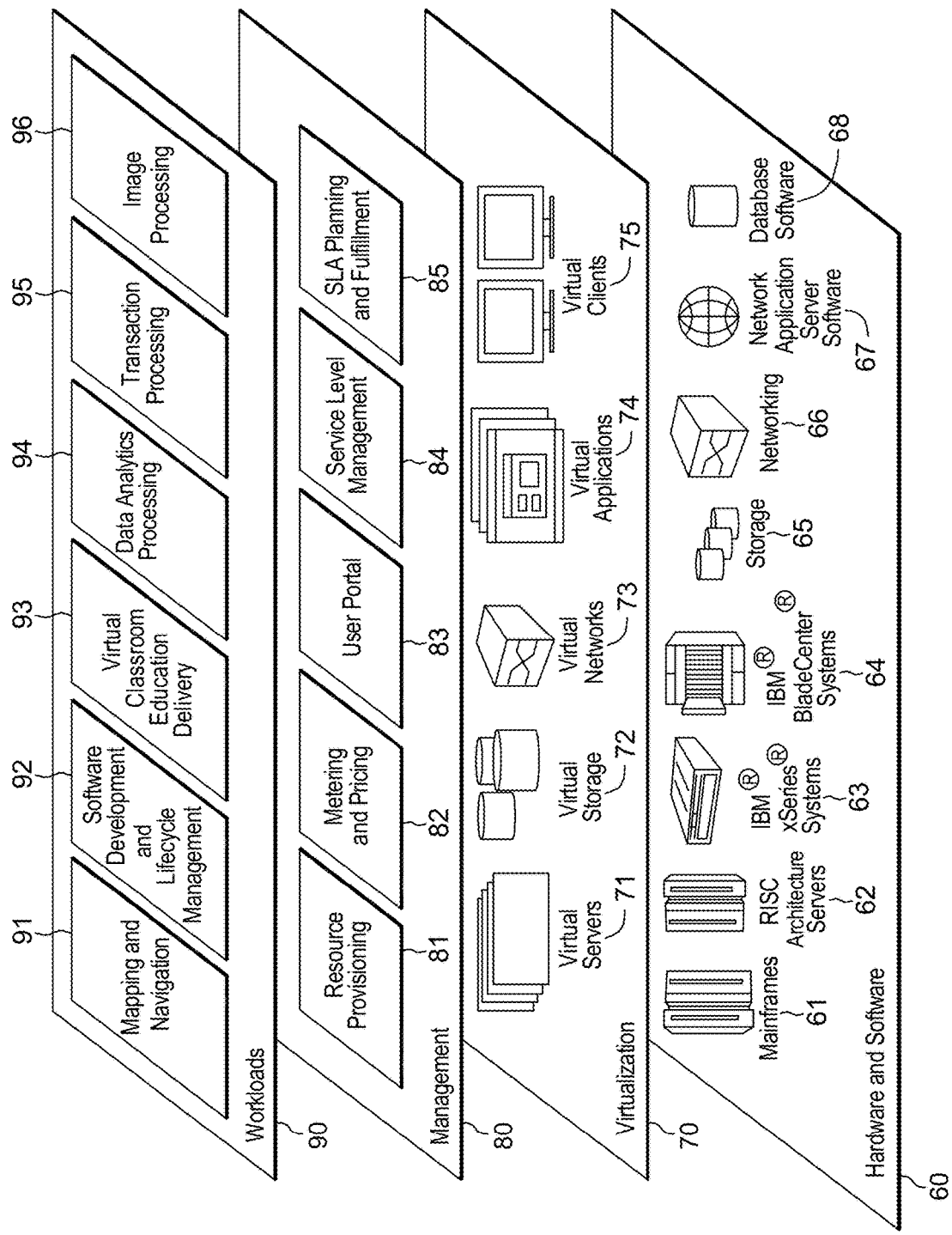
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to method 300 of FIG. 3 and functions described with reference to manager system 110 as set forth in the flowchart of FIG. 4. In one embodiment, services system 160 can include one or more computing node 10 and can include one or more program 40 for performing functions described with reference to services system 160 as set forth in the flowchart of FIG. 4. In one embodiment, administrator client computer device 120 can include one or more computing node 10 and can include one or more program 40 for performing functions described with reference to administrator client computer device 120 as set forth in the flowchart of FIG. 4. In one embodiment, service support administrator client computer device 170 can include one or more computing node 10 and can include one or more program 40 for performing functions described with reference to service support administrator client computer device 170 as set forth in the flowchart of FIG. 4. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for performing recognition processing to classify errors associated to error screens and to perform associated processing as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining iteratively captured frames of image data representing a user interface screen, wherein one or more of the frames of image data represents an error screen indicating an error condition of one or more resource of a plurality of resources of a services system;
performing recognition processing using image data of the captured frames of image data to determine an error classifier associated to the error screen indicating an error condition of one or more resource of a plurality of resources of a services system, wherein the performing recognition processing includes using historical data of a data repository, the historical data including data of past errors of the services system;
determining one or more action based on the error classifier, wherein the determining includes using a decision data structure that cognitively maps, for first through Nth error classifiers, an error classifier to at least one action associated to the error classifier; and
performing the one or more action in response to the determining, wherein the one or more action is an action for correction of the error condition indicated by the error screen indicating an error condition of one or more resource of a plurality of resources of a services system, wherein the performing recognition processing includes determining that a current error screen matches a prior registered error screen, and wherein the determining includes using an image hash of the current error screen and an image hash of a prior registered error screen.

2. The method of claim 1, wherein the one or more action includes automatically installing a software patch to a software program associated to a services system resource.

3. The method of claim 1, wherein the one or more action includes automatically installing a software patch to a software program associated to a services system resource based on one or manually entered input by an administrator user in response to one or more prompt displayed on a displayed administer user interface associated to the administrator user.

4. The method of claim 1, wherein the one or more action is an action to activate a logging profile for logging activity of a services system.

5. The method of claim 1, wherein the method includes monitoring performance of the one or more action to yield a success rating parameter of the one or more action, applying the success rating parameter to a machine learning process, and updating the decision data structure using an output of the machine learning process.

6. The method of claim 1, wherein the method includes in response to a failure of performing recognition to determine the error classifier, sending a communication to a support administrator user prompting action by the support administrator user to register a new error classifier.

7. The method of claim 1, wherein the method includes in response to the performing recognition processing opening a communication channel between a customer administrator user and a support administrator user, and wherein the performing the one or more action includes sending text based action selection data to the customer administrator user and the support administrator user.

8. The method of claim 1, wherein the performing recognition processing includes determining that a current error screen matches a prior registered error screen.

9. The method of claim 1, wherein the performing recognition processing includes determining that a current error screen matches a prior registered error screen, wherein the determining includes using Natural Language Processing (NLP) parameters obtained by subjecting the current error screen to NLP processing, and using Natural Language Processing (NLP) parameters obtained by subjecting the prior registered error screen to NLP processing.

10. The method of claim 1, wherein the performing recognition processing includes determining that context data of an error associated to a current error screen matches prior registered context data of a prior registered error screen, wherein the context data of the error associated to the current error screen indicates a certain sequence of activity events by an administrator user, and wherein the prior registered context data of the prior registered error screen commonly indicates the same certain sequence of activity events by an administrator user.

11. The method of claim 1, wherein the one or more action includes automatically installing a software patch to a software program associated to the error condition of one or more resource of a plurality of resources of the services system, wherein the automatically installing includes automatically sending the software patch to a proper address location using data returned by an IT management system of the services system that tracks a current location of the software program, wherein the method includes in response to the performing recognition processing opening a communication channel between a customer administrator user and a support administrator user, and wherein the performing the one or more action includes sending text based action selection data to the customer administrator user and the support administrator user.

12. The method of claim 1, wherein the method includes in response to a failure of performing recognition to determine the error classifier, sending a communication to a support administrator user prompting action by the support administrator user to register a new error classifier, wherein the performing recognition processing includes determining that a current error screen matches a prior registered error screen, wherein the determining includes using Natural Language Processing (NLP) parameters obtained by subjecting the current error screen to NLP processing, and using Natural Language Processing (NLP) parameters obtained by subjecting the prior registered error screen to NLP processing, and wherein the obtaining iteratively captured frames of image data representing a user interface screen includes obtaining the iteratively captured frames in response to an error report activation by an administrator user using an administrator user interface defining the user interface screen, wherein the administrator user interface is displayed on an administrator client computer device that continuously buffers screen shots of the user interface screen, wherein the obtaining iteratively captured frames of image data representing a user interface screen includes obtaining screen shots of the buffered screen shots having capture times prior to a time of the error report activation by the administrator user.

13. A computer program product comprising:
 a computer readable storage medium readable by one or more processing circuit and storing instructions for execution by one or more processor for performing a method comprising:
  obtaining iteratively captured frames of image data representing a user interface screen, wherein one or more of the frames of image data represents an error screen indicating an error condition of one or more resource of a plurality of resources of a services system;
  performing recognition processing using image data of the captured frames of image data to determine an error classifier associated to the error screen indicating an error condition of one or more resource of a plurality of resources of a services system, wherein the performing recognition processing includes using historical data of a data repository, the historical data including data of past errors of the services system;
  determining one or more action based on the error classifier, wherein the determining includes using a decision data structure that cognitively maps, for first through Nth error classifiers, an error classifier to at least one action associated to the error classifier; and
  performing the one or more action in response to the determining, wherein the one or more action is an action for correction of the error condition indicated by the error screen indicating an error condition of one or more resource of a plurality of resources of a services system, wherein the performing recognition processing includes determining that a current error screen matches a prior registered error screen, and wherein the determining includes using an image hash of the current error screen and an image hash of a prior registered error screen.

14. The computer program product of claim 13, wherein the performing recognition processing includes determining that context data of an error associated to a current error screen matches prior registered context data of a prior registered error screen, wherein the context data of the error associated to the current error screen indicates a certain sequence of activity events by an administrator user, and wherein the prior registered context data of the prior registered error screen commonly indicates the same certain sequence of activity events by an administrator user.

15. The computer program product of claim 13, wherein the one or more action includes automatically installing a software patch to a software program associated to the error condition of one or more resource of a plurality of resources of the services system, wherein the automatically installing includes automatically sending the software patch to a proper address location using data returned by an IT management system of the services system that tracks a current location of the software program, wherein the method includes in response to the performing recognition processing opening a communication channel between a customer administrator user and a support administrator user, and wherein the performing the one or more action includes sending text based action selection data to the customer administrator user and the support administrator user.

16. The computer program product of claim 13, wherein the method includes in response to a failure of performing recognition to determine the error classifier, sending a communication to a support administrator user prompting action by the support administrator user to register a new error classifier, wherein the performing recognition processing includes determining that a current error screen matches a prior registered error screen, wherein the determining includes using Natural Language Processing (NLP) parameters obtained by subjecting the current error screen to NLP processing, and using Natural Language Processing (NLP) parameters obtained by subjecting the prior registered error screen to NLP processing, and wherein the obtaining iteratively captured frames of image data representing a user interface screen includes obtaining the iteratively captured frames in response to an error report activation by an administrator user using an administrator user interface defining the user interface screen, wherein the administrator user interface is displayed on an administrator client computer device that continuously buffers screen shots of the user interface screen, wherein the obtaining iteratively captured frames of image data representing a user interface screen includes obtaining screen shots of the buffered screen shots having capture times prior to a time of the error report activation by the administrator user.

17. A system comprising:
a memory;
at least one processor in communication with the memory; and
program instructions executable by one or more processor via the memory to perform a method comprising:
obtaining iteratively captured frames of image data representing a user interface screen, wherein one or more of the frames of image data represents an error screen indicating an error condition of one or more resource of a plurality of resources of a services system;
performing recognition processing using image data of the captured frames of image data to determine an error classifier associated to the error screen indicating an error condition of one or more resource of a plurality of resources of a services system, wherein the performing recognition processing includes using historical data of a data repository, the historical data including data of past errors of the services system;
determining one or more action based on the error classifier, wherein the determining includes using a decision data structure that cognitively maps, for first through Nth error classifiers, an error classifier to at least one action associated to the error classifier; and
performing the one or more action in response to the determining, wherein the one or more action is an action for correction of the error condition indicated by the error screen indicating an error condition of one or more resource of a plurality of resources of a services system, wherein the performing recognition processing includes determining that a current error screen matches a prior registered error screen, and wherein the determining includes using an image hash of the current error screen and an image hash of a prior registered error screen.

18. The system of claim 17, wherein the performing recognition processing includes determining that context data of an error associated to a current error screen matches prior registered context data of a prior registered error screen, wherein the context data of the error associated to the current error screen indicates a certain sequence of activity events by an administrator user, and wherein the prior registered context data of the prior registered error screen commonly indicates the same certain sequence of activity events by an administrator user.

19. The system of claim 17, wherein the one or more action includes automatically installing a software patch to a software program associated to the error condition of one or more resource of a plurality of resources of the services system, wherein the automatically installing includes automatically sending the software patch to a proper address location using data returned by an IT management system of the services system that tracks a current location of the software program, wherein the method includes in response to the performing recognition processing opening a communication channel between a customer administrator user and a support administrator user, and wherein the performing the one or more action includes sending text based action selection data to the customer administrator user and the support administrator user.

20. The system of claim 17, wherein the method includes in response to a failure of performing recognition to determine the error classifier, sending a communication to a support administrator user prompting action by the support administrator user to register a new error classifier, wherein the performing recognition processing includes determining that a current error screen matches a prior registered error screen, wherein the determining includes using Natural Language Processing (NLP) parameters obtained by subjecting the current error screen to NLP processing, and using Natural Language Processing (NLP) parameters obtained by subjecting the prior registered error screen to NLP processing, and wherein the obtaining iteratively captured frames of image data representing a user interface screen includes obtaining the iteratively captured frames in response to an error report activation by an administrator user using an administrator user interface defining the user interface screen, wherein the administrator user interface is displayed on an administrator client computer device that continuously buffers screen shots of the user interface screen, wherein the obtaining iteratively captured frames of image data representing a user interface screen includes obtaining screen shots of the buffered screen shots having capture times prior to a time of the error report activation by the administrator user.

* * * * *